(12) United States Patent
Etou

(10) Patent No.: US 7,815,002 B2
(45) Date of Patent: Oct. 19, 2010

(54) SNOWMOBILE

(75) Inventor: Toyochika Etou, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 784 days.

(21) Appl. No.: 11/336,315

(22) Filed: Jan. 20, 2006

(65) Prior Publication Data

US 2006/0162977 A1    Jul. 27, 2006

(30) Foreign Application Priority Data

Jan. 21, 2005    (JP)    ............... 2005-013716

(51) Int. Cl.
B62M 27/02    (2006.01)
(52) U.S. Cl. .................. 180/190; 180/182; 180/186
(58) Field of Classification Search ................ 180/190, 180/68.4, 182, 186
See application file for complete search history.

(56) References Cited

U.S. PATENT DOCUMENTS

| | | | |
|---|---|---|---|
| 3,041,149 A | 6/1962 | Houdry | |
| 3,220,805 A | 11/1965 | Fowler | |
| 3,402,550 A | 9/1968 | Behrens | |
| 3,779,327 A | 12/1973 | Pereault | |
| 3,795,287 A | 3/1974 | Rose | |
| 4,008,777 A * | 2/1977 | Juto et al. | 180/182 |
| 4,046,219 A | 9/1977 | Shaikh | |
| 4,121,552 A | 10/1978 | Mithuo et al. | |
| 4,125,997 A | 11/1978 | Abthoff et al. | |
| 4,186,819 A | 2/1980 | Nowak et al. | |
| 4,202,297 A | 5/1980 | Oku et al. | |
| 4,249,626 A * | 2/1981 | Fields et al. | 180/68.1 |
| 4,285,311 A | 8/1981 | Tiu | |
| 4,321,893 A | 3/1982 | Yamamoto | |
| 4,325,335 A | 4/1982 | Shibata | |
| 4,333,431 A | 6/1982 | Iio et al. | |
| 4,340,123 A * | 7/1982 | Fujikawa | 180/68.1 |
| 4,341,188 A | 7/1982 | Nerstrom | |
| 4,364,346 A | 12/1982 | Shiohara | |
| 4,388,894 A | 6/1983 | Tanaka et al. | |
| 4,397,272 A | 8/1983 | Omote | |
| 4,418,782 A | 12/1983 | Nakazima | |
| 4,516,540 A | 5/1985 | Nerstrom | |

(Continued)

FOREIGN PATENT DOCUMENTS

EP    0152153    8/1995

(Continued)

Primary Examiner—Kevin Hurley
Assistant Examiner—Maurice Williams
(74) Attorney, Agent, or Firm—Keating & Bennett, LLP

(57) ABSTRACT

A snowmobile is provided that includes rearward portion comprising at least one vehicle component (e.g., a seat, or a fuel tank). The snowmobile also includes an exhaust pipe, a radiator, a fan, and a duct. The exhaust pipe extends from an engine compartment in a forward portion to the rearward portion of the snowmobile. The radiator is positioned in the engine compartment. The fan is positioned near the radiator and the duct is provided on a rear side of the fan. The duct extends from the engine compartment to the rearward portion of the snowmobile. The fan and the duct cause air to pass through the radiator and to be discharged outside of the engine compartment. The duct is located between the exhaust pipe and the at least one vehicle component.

20 Claims, 10 Drawing Sheets

U.S. PATENT DOCUMENTS

| | | | |
|---|---|---|---|
| 4,541,645 A * | 9/1985 | Foeldesi | 180/68.4 |
| 4,653,270 A | 3/1987 | Takii | |
| 4,658,795 A | 4/1987 | Kawashima et al. | |
| 4,671,220 A | 6/1987 | Inoue et al. | |
| 4,766,866 A | 8/1988 | Takii et al. | |
| 4,779,415 A | 10/1988 | Richardson et al. | |
| 4,785,626 A | 11/1988 | Shiraishi | |
| 4,793,347 A | 12/1988 | Taniuchi et al. | |
| 4,795,420 A | 1/1989 | Sakurai et al. | |
| 4,809,647 A | 3/1989 | Masumoto et al. | |
| 4,869,063 A | 9/1989 | Sakurai et al. | |
| 4,892,164 A | 1/1990 | Yasui et al. | |
| 4,909,193 A | 3/1990 | Boyesen | |
| 4,917,207 A | 4/1990 | Yasui et al. | |
| 4,930,678 A | 6/1990 | Cyh | |
| 4,939,898 A | 7/1990 | Ichimura et al. | |
| 4,957,664 A | 9/1990 | Kohno et al. | |
| 4,986,780 A | 1/1991 | Sougawa | |
| 4,998,512 A | 3/1991 | Masuda et al. | |
| 4,999,999 A | 3/1991 | Takahashi et al. | |
| 5,000,131 A | 3/1991 | Masuda | |
| 5,010,731 A | 4/1991 | Onishi | |
| 5,018,503 A | 5/1991 | Hoshiba | |
| 5,048,471 A | 9/1991 | Takii et al. | |
| 5,063,887 A | 11/1991 | Ozawa et al. | |
| 5,063,888 A | 11/1991 | Ozawa et al. | |
| 5,094,217 A | 3/1992 | Kaku et al. | |
| 5,117,932 A | 6/1992 | Kurosu et al. | |
| 5,129,473 A * | 7/1992 | Boyer | 180/68.1 |
| 5,152,255 A | 10/1992 | Fukada | |
| 5,152,365 A | 10/1992 | Aoshima | |
| 5,183,013 A | 2/1993 | Ito et al. | |
| 5,190,006 A | 3/1993 | Motoyama et al. | |
| 5,190,148 A | 3/1993 | Williams | |
| 5,212,949 A | 5/1993 | Shiozawa | |
| 5,220,890 A | 6/1993 | Koriyama | |
| 5,240,649 A | 8/1993 | Yamada et al. | |
| 5,251,718 A * | 10/1993 | Inagawa et al. | 180/190 |
| 5,279,381 A | 1/1994 | Fukuda | |
| 5,285,639 A | 2/1994 | Araki et al. | |
| 5,322,044 A | 6/1994 | Maebashi | |
| 5,365,908 A | 11/1994 | Takii et al. | |
| 5,400,755 A | 3/1995 | Maebashi | |
| 5,410,993 A | 5/1995 | Masuda et al. | |
| 5,443,547 A | 8/1995 | Morikawa | |
| 5,537,958 A | 7/1996 | Nishimura | |
| 5,575,246 A | 11/1996 | Ito | |
| 5,588,402 A | 12/1996 | Lawrence | |
| 5,598,813 A | 2/1997 | Masuda et al. | |
| 5,605,119 A | 2/1997 | Masuda et al. | |
| 5,660,152 A | 8/1997 | Masuda | |
| 5,709,177 A | 1/1998 | Worth et al. | |
| 5,715,794 A | 2/1998 | Nakamura et al. | |
| 5,746,049 A | 5/1998 | Cullen et al. | |
| 5,746,173 A | 5/1998 | Takii et al. | |
| 5,782,214 A | 7/1998 | Nanami | |
| 5,804,147 A | 9/1998 | Blanchet et al. | |
| 5,814,283 A | 9/1998 | Matuoka | |
| 5,822,976 A | 10/1998 | Cockerill | |
| 5,827,096 A | 10/1998 | Mineo | |
| 5,862,662 A | 1/1999 | Fukuda et al. | |
| 5,878,702 A | 3/1999 | Motoyama et al. | |
| 5,934,958 A | 8/1999 | Ochiai | |
| 5,957,230 A | 9/1999 | Harano et al. | |
| 5,961,294 A | 10/1999 | Hataura et al. | |
| 5,992,552 A | 11/1999 | Eto | |
| 5,997,373 A | 12/1999 | Asai et al. | |
| 6,000,217 A | 12/1999 | Hochmuth | |
| 6,007,392 A | 12/1999 | Motose | |
| 6,021,748 A | 2/2000 | Motose | |
| 6,039,013 A | 3/2000 | Motose | |
| 6,109,217 A | 8/2000 | Hedlund et al. | |
| 6,134,885 A | 10/2000 | Gilbertson | |
| 6,155,374 A | 12/2000 | Uchida | |
| 6,167,700 B1 | 1/2001 | Lampert | |
| 6,216,809 B1 | 4/2001 | Etou et al. | |
| 6,227,323 B1 | 5/2001 | Ashida | |
| 6,227,922 B1 | 5/2001 | Ochiai | |
| 6,237,566 B1 | 5/2001 | Spaulding | |
| 6,250,281 B1 | 6/2001 | Takii et al. | |
| 6,263,991 B1 | 7/2001 | Savage et al. | |
| 6,523,342 B2 | 2/2003 | Küper | |
| 6,622,671 B2 | 9/2003 | Uchida | |
| 6,655,134 B2 | 12/2003 | Nakayasu et al. | |
| 6,808,034 B2 | 10/2004 | Nakano et al. | |
| 6,848,529 B2 | 2/2005 | Moriyama | |
| 6,904,990 B2 | 6/2005 | Etou et al. | |
| 6,926,107 B2 * | 8/2005 | Nishijima | 180/190 |
| 7,080,704 B1 * | 7/2006 | Kerner et al. | 180/68.1 |
| 7,171,804 B2 | 2/2007 | Terashima | |
| 7,306,067 B2 | 12/2007 | Yamamoto | |
| 7,353,899 B2 * | 4/2008 | Abe et al. | 180/68.3 |
| 2001/0010804 A1 | 8/2001 | Majima | |
| 2002/0134603 A1 | 9/2002 | Ashida et al. | |
| 2005/0205334 A1 | 9/2005 | Moriyama | |
| 2006/0150617 A1 | 7/2006 | Nishimura et al. | |
| 2006/0175107 A1 | 8/2006 | Etou | |

FOREIGN PATENT DOCUMENTS

| | | |
|---|---|---|
| JP | 53-59014 | 5/1978 |
| JP | 63212728 | 9/1988 |
| JP | 02-37110 | 2/1990 |
| JP | 02-75721 | 3/1990 |
| JP | 09-133016 | 5/1997 |
| JP | 2001-173437 | 6/2001 |
| JP | 2002-178980 | 6/2002 |

* cited by examiner

SNOWMOBILE

CROSS-REFERENCE TO RELATED APPLICATIONS

This application claims priority under 35 U.S.C. §119(a) to Japanese Patent Application Serial No. 2005-013716, filed Jan. 21, 2005, the entire contents of which is hereby incorporated by reference.

BACKGROUND OF THE INVENTION

1. Field of the Invention

The application is directed to a snowmobile that has an exhaust pipe extending above a track belt from an engine compartment to a rear of a vehicle body.

2. Description of the Related Art

Conventional snowmobiles provide a seat for a rider on an upper part of the vehicle body from which the rider can grip a front steering handle. In such snowmobiles, an engine typically is mounted in an engine compartment located in a forward portion of the vehicle body. Exhaust gas generally is discharged below the engine compartment. However, in this arrangement, many of the heaviest components of the snowmobile, e.g., the engine and the exhaust pipe, are positioned at the forward portion of the vehicle body. As such, the weight of the forward portion of the vehicle body is large compared to the weight of the rearward portion.

In one prior design, a snowmobile is arranged such that the weight balance is improved by positioning a muffler and a substantial portion of the exhaust pipe at a rearward portion of the vehicle body. In this prior design, the engine is mounted in the engine compartment in the forward portion of the vehicle body. Other components that form an external portion of the vehicle, e.g., an external surface of the snowmobile, such as a fuel tank and a seat, are positioned at a rearward portion, above a track belt. These components are located above an upper frame portion. The exhaust pipe of this prior design extends in a longitudinal direction of the vehicle body between the track belt and an upper frame portion to which other vehicle components such as the fuel tank and seat are attached.

In the above described prior design, the muffler is positioned downstream beside the rear end of the vehicle body. This muffler is accommodated in a rear end of the seat. In this prior design, a tail pipe is provided for discharging exhaust gas to the atmosphere. The tail pipe is provided on both lateral sides of the muffler and of the vehicle, extending rearward and upward. Additionally, the tail pipe protrudes rearward from the rear end of the seat. As such, this exhaust system discharged the snowmobile's exhaust gas rearward and upward from the rear end of the vehicle body.

Other conventional snowmobiles have a water-cooled engine and a cooling system with a radiator to cool the coolant circulated through the engine. The radiator sometimes is mounted in the engine compartment. The cooling system can include a ventilating fan and a duct that cause the air in the engine compartment to pass through the radiator and to be discharged to the outside of the engine compartment. An air outlet of this cooling device faces the rear of the vehicle body, but is located forward of a passenger area, on one side of the steering handle.

SUMMARY OF THE INVENTION

One problem with the first prior design is that heat from the exhaust pipe can be transmitted to the fuel tank and the seat through the upper frame portion because the exhaust pipe is disposed below the upper frame portion, which supports the fuel tank and the seat. Excessive heating of these components can be disadvantageous if these components are formed of a relatively low melting point material, such as a synthetic resin. Accordingly, the conventional snowmobile has a heat insulating material between such vehicle components and the upper frame portion that prevents the heat of the exhaust pipe from being transferred to these components. However, it would be desirable to improve the degree of heat insulation between the exhaust pipe and these components to provide higher reliability.

In one aspect, this application is directed to improve the thermal insulation of some vehicle components from the exhaust pipe heat. For example, an object is to provide a snowmobile in which thermal insulation between the exhaust pipe and various vehicle components, such as the seat and the fuel tank, is more efficient, e.g., wherein less heat is transferred from the exhaust pipe to at least one of the fuel tank and the seat through the upper frame portion.

In one aspect, this object can be achieved in a snowmobile that has a heat exchanger that is provided in an engine room or compartment in a forward portion of a vehicle body. The snowmobile also has a ventilating fan and a duct that cause the air to pass through the heat exchanger and to be discharged to an outside of the engine compartment. The snowmobile also includes an exhaust pipe that extends above a track belt from the engine compartment toward a rear portion of the vehicle body. The ventilating fan can be positioned near the heat exchanger and the duct can be provided rearward of the ventilating fan. The duct can extend from the engine compartment toward a rear portion of the vehicle body, e.g., between the exhaust pipe and one or more vehicle components located above the exhaust pipe. For example, the duct can extend between the exhaust pipe and at least one of the seat and the fuel tank of the snowmobile, which can be located above the exhaust pipe.

In another aspect, a snowmobile can be provided in which vehicle components located above the exhaust pipe are mounted to an upper side of an upper frame portion. The upper frame portion extends above the exhaust pipe from the engine compartment to the rear portion of the vehicle body in one arrangement. The duct located between the exhaust pipe and the vehicle components can be formed at least in part by the upper frame portion and a duct main body that has a generally inverted U-shaped cross-section. The duct main body can be provided on an upper side of the upper frame portion.

In another aspect, a snowmobile can be provided with a duct main body that includes a storage portion with a recess that opens upwardly. The storage portion can be provided on a lateral side of the duct main body, e.g., laterally spaced from a vertical central longitudinal plane of the snowmobile. An air passage can be provided on another lateral side, e.g., laterally spaced from a vertical central longitudinal plane of the snowmobile. In one arrangement, the vertical central longitudinal plane of the snowmobile is located between the storage portion and the air passage. The air passage can be located on one side of the duct main body and the exhaust pipe can be disposed below the air passage.

In another aspect, a snowmobile includes a muffler coupled with the exhaust pipe. The muffler can be disposed in a rear end portion of the duct. Air from the duct can be discharged onto or toward the muffler to cool the muffler.

In another aspect, the snowmobile includes a heat exchanger and a vehicle body cover that covers at least a forward portion of the engine compartment. The vehicle body cover includes an outside air intake port. The heat exchanger can be positioned at a location off-set from a rearward projection of the air intake port, e.g., in an upper portion of the engine compartment.

One advantage provided by the foregoing arrangements, as further discussed below, is that the duct, which discharges the air passing through the heat exchanger, functions substantially as an insulator that reduces, minimizes, or prevents the transmission of heat from the exhaust pipe to vehicle components adjacent to, e.g., above, the duct. Airflow in the duct prevents hot air from accumulating in the duct. Accordingly, the duct provides beneficial heat insulating properties.

Accordingly, a snowmobile can be arranged to provide efficient thermal insulation between the exhaust pipe and vehicle components above the exhaust pipe.

Also, the cost of constructing the snowmobiles described herein can be kept low because the duct for cooling the heat exchanger also thermally insulates vehicle components from the heat below these components compared to an arrangement in which separate ducts are provided for insulating and for venting air from the engine compartment as described above.

Also, a relatively low cost design can be provided when the duct main body is formed as an inverted U-shaped section, e.g., one that can be easily molded by a die. The air duct can be formed by mounting a duct main body onto the upper frame portion. This simple construction provides further cost reduction.

In another aspect, a storage box can be provided. One construction provides the storage box as a portion of the duct main body, e.g., with a monolithic or unitary construction. A monolithic or unitary construction can reduce the number of components compared with a construction in which a snowmobile is provided with a separate storage.

In another aspect, an accommodation or storage portion is formed around or adjacent to an upper part of the exhaust pipe. As discussed below, the heat insulating effects of the arrangement described herein are not impaired by the storage portion. Also, a large storage portion can be formed within surplus space formed between the exhaust pipe and external vehicle components, such as the seat and the fuel tank. The storage portion can take the form of a storage box. In one arrangement, the storage portion is formed on one lateral side of the snowmobile. This arrangement enables the storage portion to have a larger common volume than other arrangements where the storage portion is located on both lateral sides, e.g., on both lateral sides of the exhaust pipe. Also, a relatively large volume storage portion can be provided, while maintaining the vehicle external components at a relatively low height. In particular, in one aspect, a duct is formed with a relatively low maximum height, compared with an arrangement where the air passage portion and the storage portion are juxtaposed in the vertical direction. The snowmobile can be made easier to mount and/or ride if the heights of the vehicle components is kept relatively low.

In another aspect, the muffler can be cooled by the flow of air that also has cooled the heat exchanger. Accordingly, the cost of the snowmobile can be reduced because a dedicated cooling air duct is not required to provide cool air to the muffler.

In another aspect, snow entering the engine compartment from the outside air intake port of the vehicle body cover can be prevented from adhering to the heat exchanger. Preventing snow from adhering to the heat exchanger can prevent the cooling capacity of the heat exchanger from being degraded, e.g., by the snow blocking airflow through the heat exchanger. Also, by preventing the snow from contacting the heat exchanger, an increase in the content of water vapor in the engine compartment can be minimized or avoided. This can increase the useful life of components that can be degraded by being exposed to water vapor. This also can prevent the condensation of such water vapor on components, which can build up as frost or ice and can impair the performance of such components.

In another aspect, the heat exchanger can be detached from a side portion of the vehicle body by a simple operation, e.g., without using any tools. This arrangement enables exchange or maintenance of components located below the heat exchanger. For example, where the heat exchanger is located above the engine, the detachable heat exchanger design enables access to spark plugs, which can be replaced or serviced more easily if not blocked by the heat exchanger.

In another aspect, a snowmobile includes a detachable securing means for mounting the heat exchanger to a front frame portion of the vehicle body.

This application is directed to providing a snowmobile that more efficiently provides thermal insulation between an exhaust pipe and vehicle components above the exhaust pipe.

In another aspect, a snowmobile is provided that is configured to be drive by a track belt. The snowmobile includes a forward portion defining an engine compartment and a rearward portion comprising at least one vehicle component (e.g., a seat, or a fuel tank). The snowmobile also includes an exhaust pipe, a radiator, a fan, and a duct. The exhaust pipe extends above the track belt from the engine compartment to the rearward portion of the snowmobile. The radiator is positioned in the engine compartment. The fan is positioned near the radiator and the duct is provided on a rear side of the fan. The duct extends from the engine compartment to the rearward portion of the snowmobile. The fan and the duct cause air to pass through the radiator and to be discharged outside of the engine compartment. The duct is located between the exhaust pipe and the at least one vehicle component.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENT

Embodiments of the present invention will be hereinafter described in connection with the attached drawings.

Figure 1:
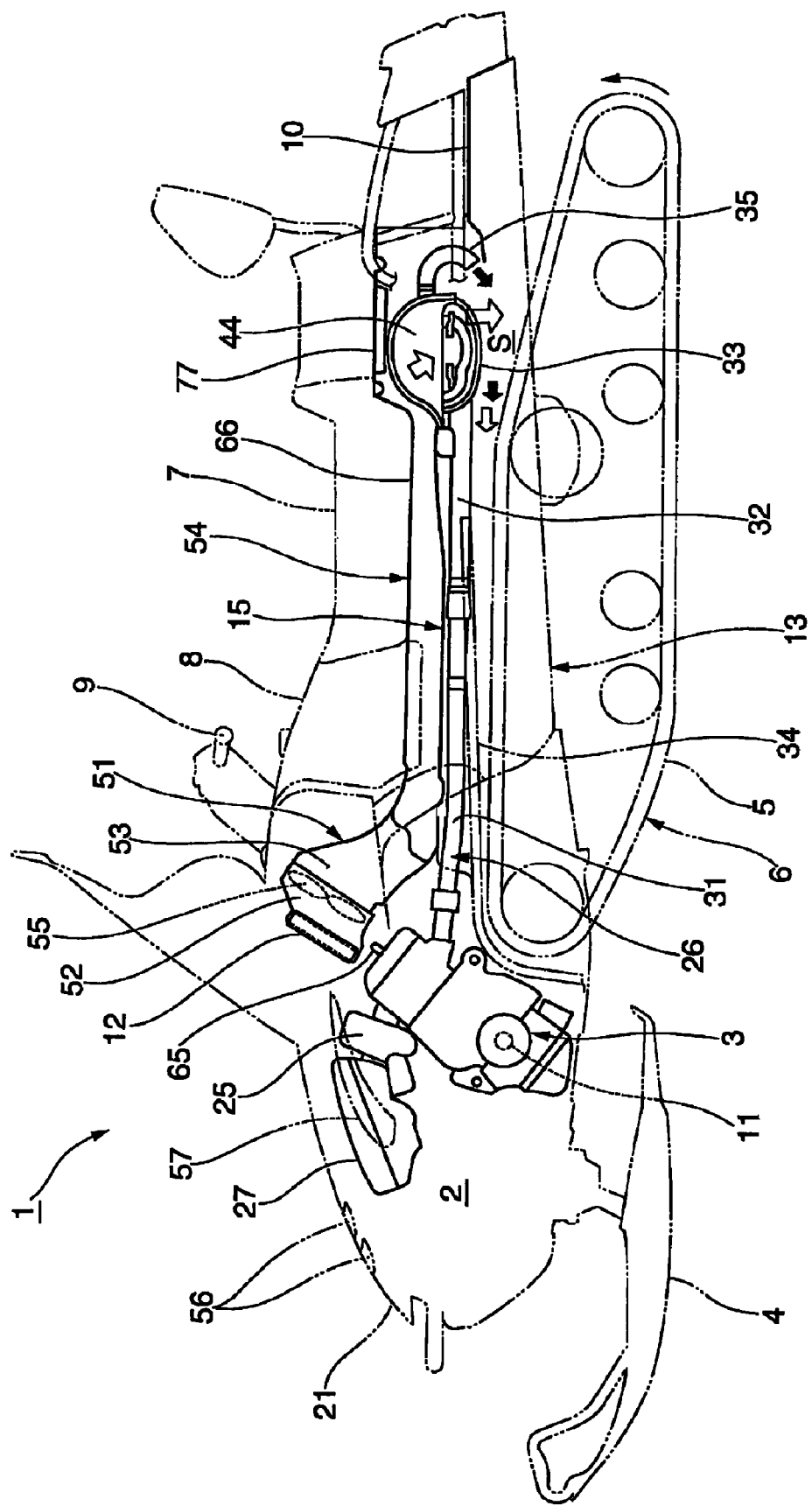
FIG. 1 is a side view showing one embodiment of a snowmobile according to one embodiment.
Figure 2:
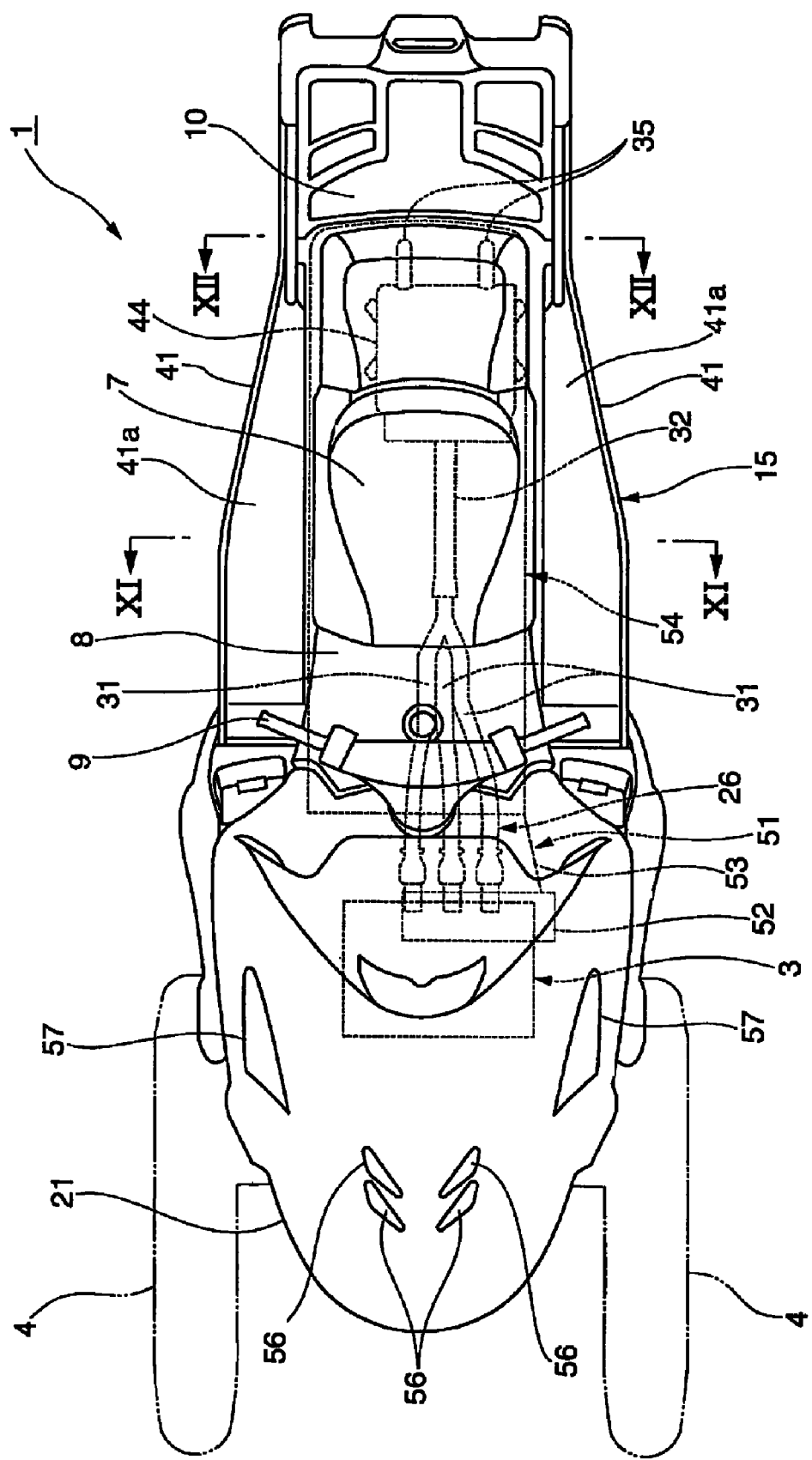
FIG. 2 a top plan view of the snowmobile and the exhaust system of FIG. 1.

With reference to FIGS. 1 and 2, one embodiment of a snowmobile 1 has an engine 3 mounted in an engine compartment 2 located in a forward portion of a vehicle body. The snowmobile 1 is steered by a pair of left and right steering skis 4, 4 and is propelled by a track belt 5 that is rotated by the engine 3. The track belt 5 is coupled with a driven unit 6 that can be located near a laterally central portion of the vehicle. The driven unit 6 is propelled by a transfer of power from the engine 3 via a drive mechanism or transmission not shown in the drawing.

The snowmobile 1 includes a vehicle body upper portion. Among the components that can be mounted to the vehicle body upper portion are a seat 7 on which a passenger or crew (not shown in the drawing) sits while operating the vehicle, a fuel tank 8, and a steering handle 9 that the crew grips.

Figure 11:
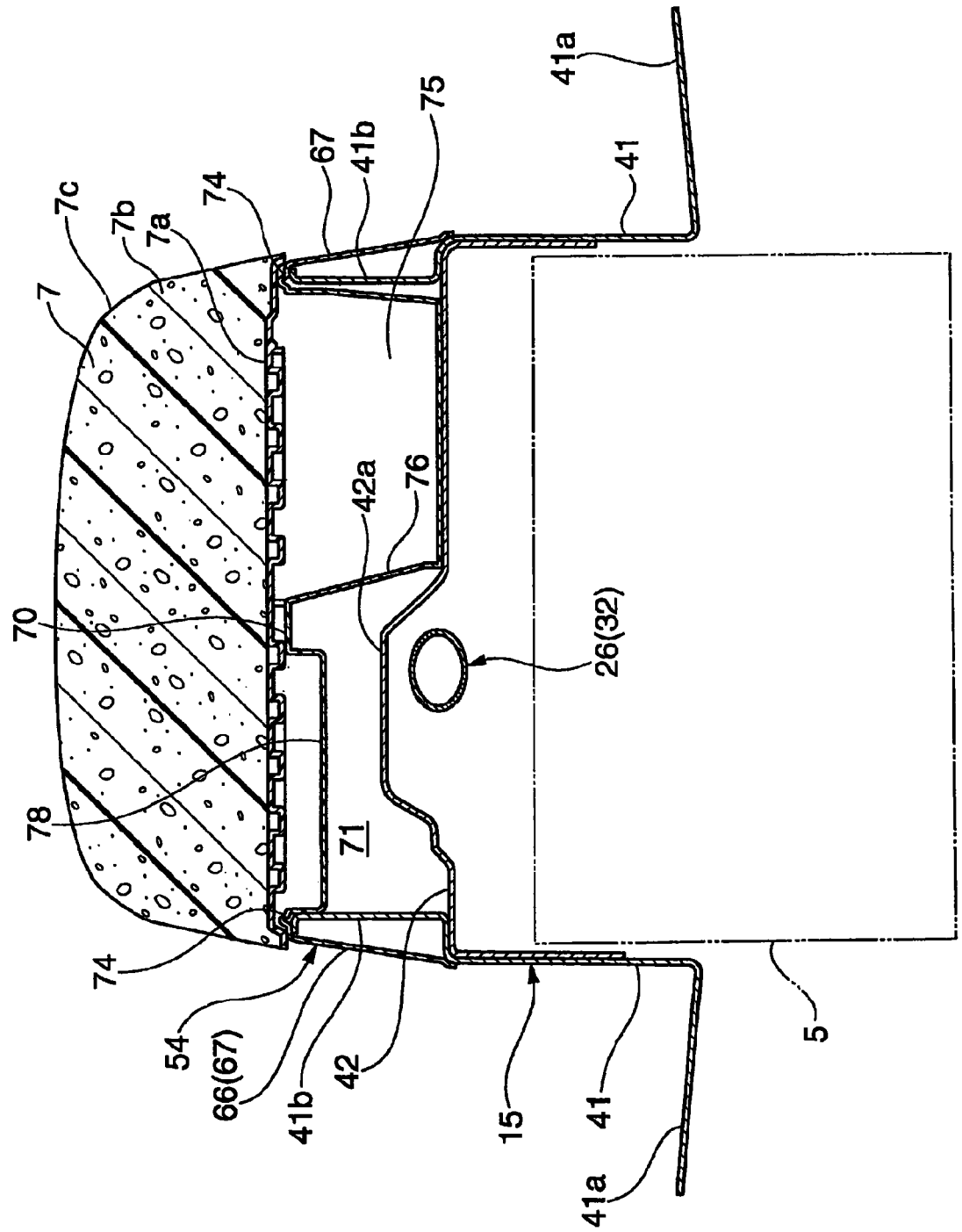
FIG. 11 is cross-section view of a vehicle body upper portion, the cross-section being taken at section plane 11-11 shown in FIG. 2.
Figure 12:
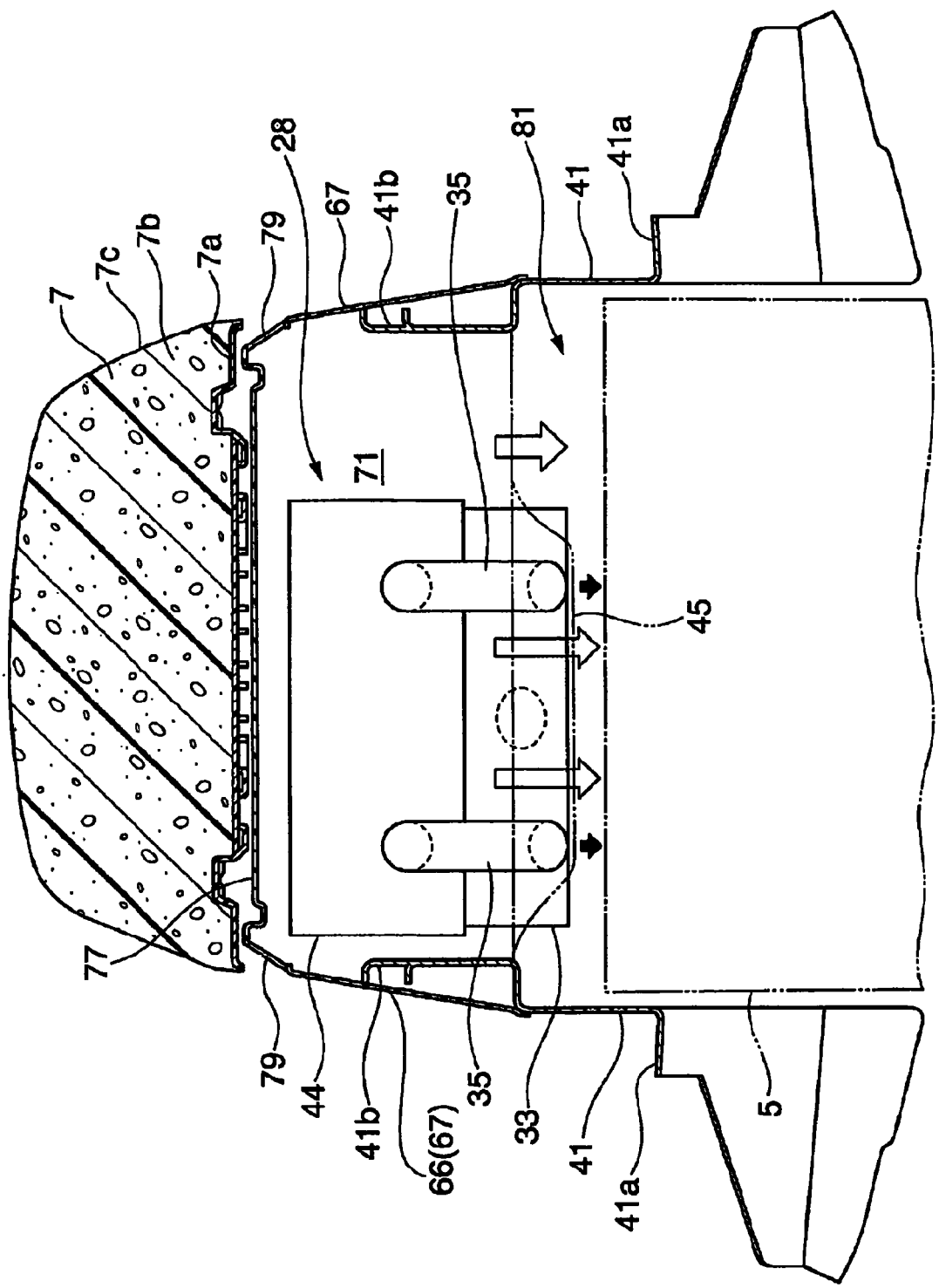
FIG. 12 is cross-section view of a vehicle body upper portion, the cross-section being taken at section plane 12-12 shown in FIG. 2.

FIGS. 11 and 12 show that the seat 7 can include a bottom plate 7a, cushion material 7b, and a skin 7c or similar structure to cover a surface of this cushion material 7b. The bottom plate 7a can be made of a synthetic resin. The fuel tank 8 also can be made of a synthetic resin. The fuel tank 8 can be molded to a predetermined shape, e.g., by a blow molding process or the like. The seat 7 and the fuel tank 8 are examples of vehicle components and are sometimes referred to herein as external vehicle components because they form a portion of the external surface of the snowmobile 1. The steering handle 9 can be connected to the left and right steering skis 4, 4 by a conventional steering linkage. In one embodiment, the snowmobile 1 includes a load-carrying platform 10 positioned behind the rear of the seat 7.

In one embodiment of the snowmobile 1, the engine 3 is a water-cooled 4-cycle 3-cylinder engine. FIGS. 1 and 2 show that the engine 3 can be mounted to a lower portion of the engine compartment 2. The engine 3 can be mounted such that a longitudinal axis of a crank shaft 11 of the engine 3 is arranged substantially perpendicular to the longitudinal axis of the snowmobile, e.g., the engine can be transversely mounted in the engine compartment 2. A heat exchanger 12 can be coupled to the engine to cool cooling fluid used to cool the engine. In some embodiments, the heat exchanger 12 is configured as a radiator. The heat exchanger 12 could cool other fluids on the vehicle, e.g., fuel, in other embodiments. The heat exchanger 12 can be disposed in an upper portion of the engine compartment 2 and above the engine 3, as discussed further below.

The engine 3 can be supported by a frame member, not shown in the drawings, that at least partially defines the engine compartment 2. The frame member can be formed in a shape enclosing, shielding, or substantially surrounding the engine 3 from below, the rear, and at least one lateral side. In one embodiment, the frame member that at least partly defines the engine compartment 2 can constitute one portion of a vehicle body frame 13 (shown in FIG. 1) of the snowmobile 1. This vehicle body frame 13 includes a forward frame portion 14 (refer to FIG. 5) including the frame member at least partly defining the engine compartment 2, and a rearward frame portion 15 (refer to FIG. 7). The rearward frame portion 15 can be connected to a rear end part of the front frame portion 14.

Figure 5:
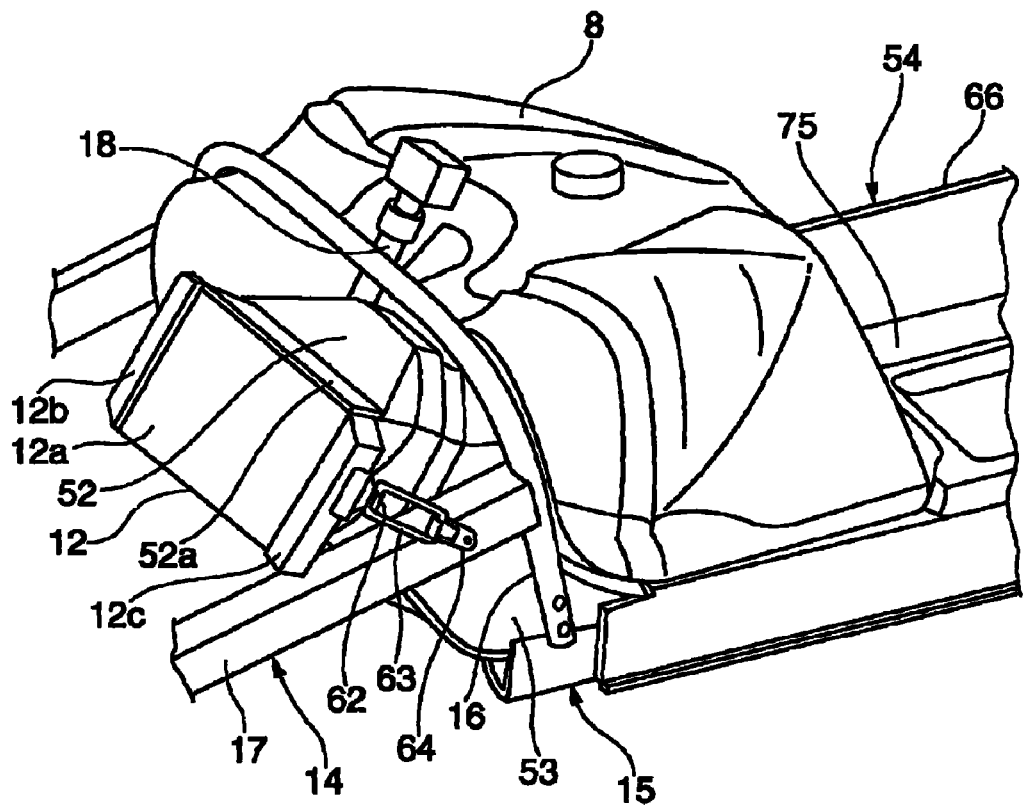
FIG. 5 a perspective view showing a fuel tank mounted to a vehicle frame.

FIG. 5 shows that the front frame portion 14 can include a cross member 16 that in one embodiment includes a pipe that is connected to a front end of the rearward frame portion 15. The cross member 16 extends upwardly above the front end of the rearward frame portion 15. The front frame portion 14 also can include a front frame portion main body 17 that extends forwardly and that slants downwardly toward the front of the snowmobile 1. The front frame portion main body 17 can extend downwardly from about half-way up the cross member 16. The front frame portion main body 17 can extend from the frame member that at least partially defines the engine compartment 2, discussed above, which frame member extends forward from the front end part of the rear frame portion 15. Although not shown in the drawings, the front frame portion main body 17 can be configured as a U-shaped member that is open toward the rear of the vehicle body in a top plan view. In one construction, the rear end portions of the U-shaped front frame portion main body 17 are welded to the cross member 16 on lateral sides of the snowmobile 1.

FIG. 5 shows that a support 18 can be provided at a laterally central portion of the cross member 16. The support 18 can be located on or near a vertical longitudinal central plane of the snowmobile 1 and can enable rotation of a steering shaft (not shown in FIG. 5) of the steering handle 9. The support 18 can be configured as a pipe. FIG. 5 also shows that a forward portion of the fuel tank 8 can be located near a rearward portion of the cross member 16.

Figure 3:
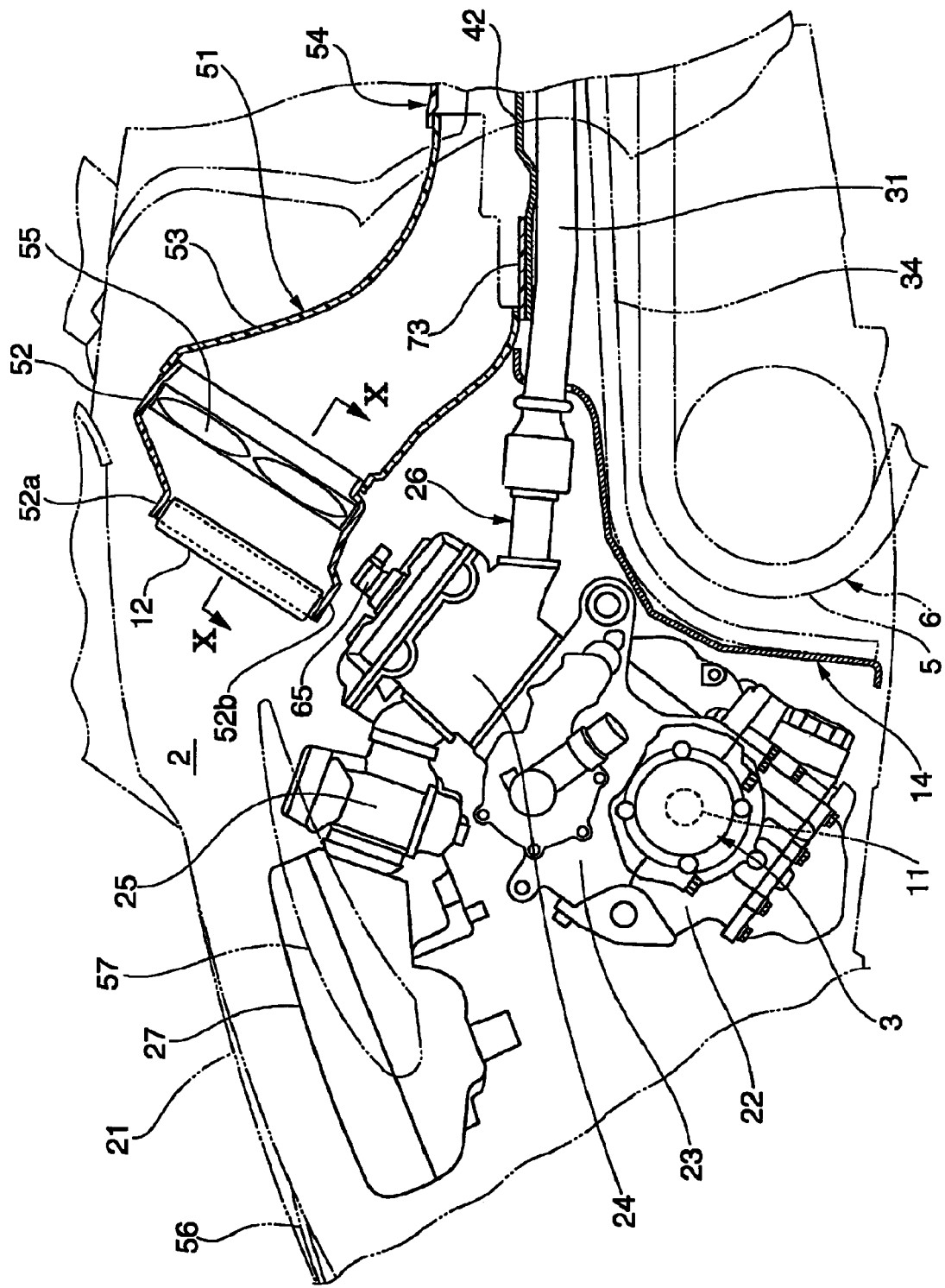
FIG. 3 an enlarged side view showing a portion of an engine compartment in partial cross-section.

FIGS. 1-3 shows that the engine compartment 2 of the snowmobile 1 can be defined at least in part by the front frame portion 14, a front face of the fuel tank 8, and a vehicle body cover 21. The vehicle body cover 21 covers a front part of the vehicle body.

With reference to FIG. 3, the engine 3 includes a crank case 22 and a cylinder body 23 and rotatably supports the crank shaft 11. In one embodiment, a carburetor 25 is connected to a forward facing side of a cylinder head 24 of the engine 3 and an air cleaner 27 is connected to and located upstream of the carburetor 25. In one embodiment, a carburetor 25 is provided for each cylinder, drawing air from a common air cleaner 27. In another embodiment, one carburetor 25 is provided for all cylinders, drawing air from a common air cleaner 27. An exhaust system 28 is provided that has an exhaust pipe 26 connected to a rear-facing side of the cylinder head 24. The exhaust pipe 26 is discussed in greater detail below.

Figure 4:
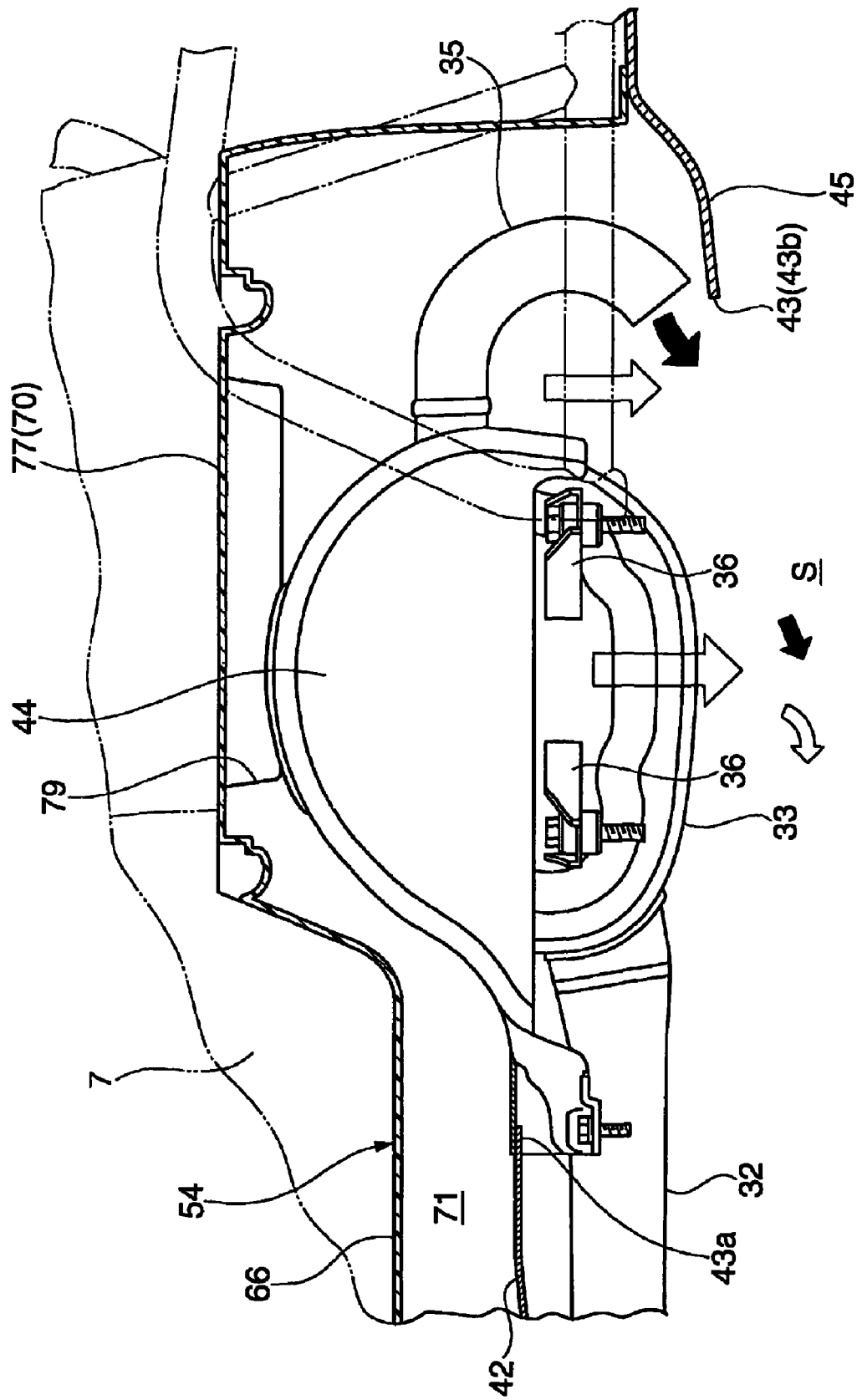
FIG. 4 an enlarged side view showing a rearward portion of a vehicle body in partial cross-section.

With reference to FIGS. 1 and 2, the exhaust pipe 26 has a forward branch 31 for every cylinder of the engine 3. The forward branch 31 extends in an approximately horizontal direction above the track belt 5 from the engine 3 toward the rear of the vehicle body. Rearward portions of the forward branches 31 merge into a merged or collected pipe 32 below the seat 7 in one embodiment. A merged or collected pipe 32 is a common pipe and that extends approximately horizontally toward the rear of the vehicle body in one embodiment. The merged pipe 32 is coupled with or is connected to a muffler 33. FIG. 4 shows the merged pipe 32 connected to the muffler 33 at a location in the rearward portion of the vehicle body. FIG. 2 shows that in one embodiment, the exhaust pipe 26 is disposed in a position that is offset from the longitudinal center (e.g., a vertical longitudinal central plane) of the vehicle body, e.g., toward the left side of the vehicle body. The exhaust pipe 26 could be offset toward the right side of the vehicle body in other arrangements.

FIGS. 1 and 3 show a heat sink 34 that is provided between the forward branches 31 and the track belt 5. The heat sink is configured to cool the coolant used to cool the engine 3. The heat sink 34 has a shape similar to the shape of the track belt 5, e.g., having a forward curved portion and a straight upper portion. The heat sink 34 is attached to a rear-facing side of the forward frame portion 14 in one embodiment. The heat sink 34 has a coolant passage though which the coolant flows. The heat sink 34 extends rearward along an upper face of the track belt 5 from adjacent to the rear of the engine 3 to a location adjacent to a lower portion of the seat 7.

In one embodiment, the muffler 33 is a multistage expansion muffler. The muffler 33 is configured to discharge an exhaust gas from a pair of tail pipes 35 that protrude from a rear end thereof. This tail pipes 35 preferably are bent such that a discharge port thereof is directed toward a front lower portion of the snowmobile 1, e.g., slantingly directed toward a front lower portion of the snowmobile 1. FIG. 1 shows that in one embodiment, the exhaust gas is discharged from the tail pipe 35 toward the track belt 5.

Figure 7:
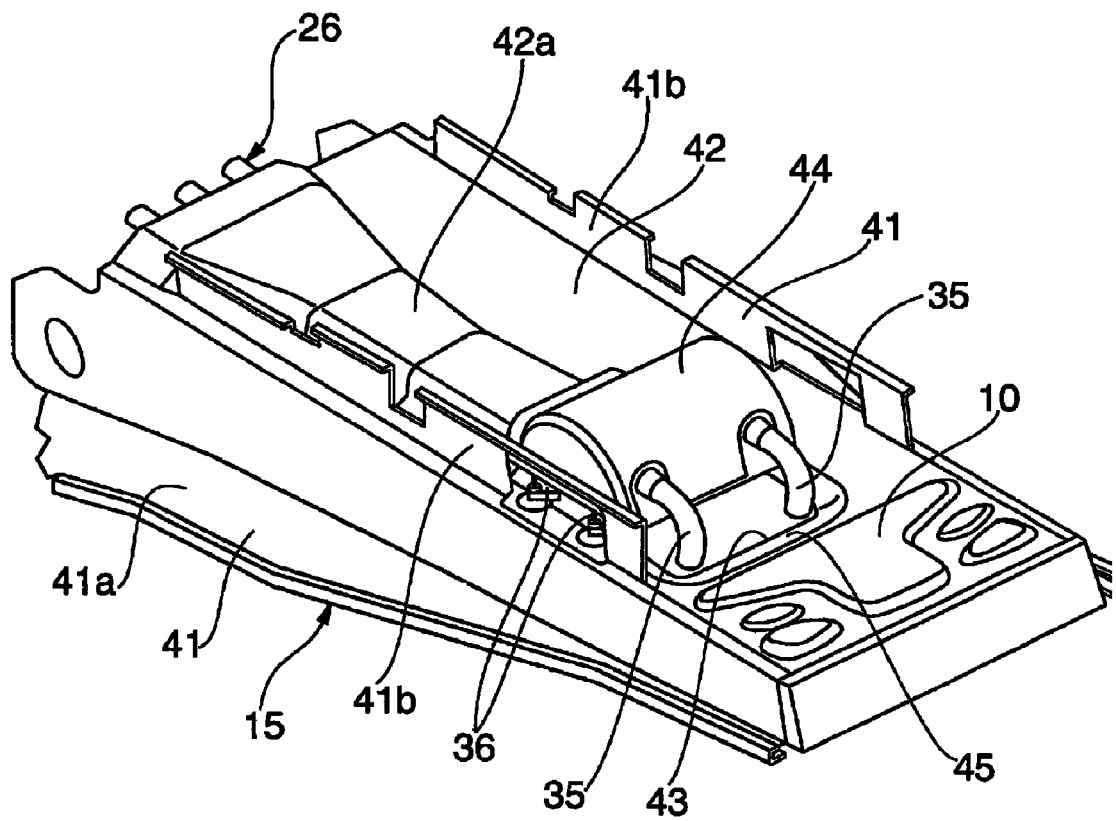
FIG. 7 is a perspective view of a rearward portion of a vehicle frame to which an exhaust pipe and a muffler can be mounted.

With reference to FIGS. 4 and 7, the muffler 33 includes attaching brackets 36 by which the muffler is attached to the rearward frame portion 15. The attaching brackets 36 can be located at forward and rearward end portions of the muffler 33. In one embodiment, the attaching brackets 36 protrude from the muffler 33.

With reference to FIGS. 7, 11, and 12, the rearward frame portion 15 includes a pair of side frame portion 41. The side frame portions 41 are located on both lateral sides of the vehicle. An upper frame portion 42 extends above the track belt 5 and connects upper portion of the side frame portions 41. The upper frame portion 42 is formed in a shape to cover an upper portion of the track belt 5 from above. The side frame portions 41 preferably are located laterally outside of the track belt 5. FIG. 1 shows that in one arrangement, a lower portion of the side frame portion 41 is formed to overlap with or to cover at least a portion of the track belt 5 as viewed from the side.

The exhaust pipe 26 is disposed between the upper frame portion 42 and the track belt 5. The side frame portion 41 and the upper frame portion 42 can be formed by forming a plate member of a suitable material, such as aluminum alloy, to a predetermined shape. One technique for forming the frame portions is by press working and the like.

With reference to FIGS. 11 and 12, a step 41a on which the crew puts his/her foot can be formed to extend outward from a lower end portion of the side frame portion 41. The side frame portion 41 also can include a longitudinal plate 41b for mounting at least one vehicle component, such as at least one of the seat 7 and the fuel tank 8. The longitudinal plate 41b can be located in an upper portion of the side frame portion 41. The longitudinal plate 41b can be formed monolithically with the side frame portion 41 and can extend in a forward and rearward direction of the vehicle body.

FIGS. 7 and 11 show that in one embodiment, the upper frame portion 42 includes an elevated portion 42a that is configured to accommodate the exhaust pipe 26. The elevated portion can be located on one side part in the vehicle body, e.g., on the left side of the upper frame portion 42. Further, FIGS. 4 and 7 show that the upper frame portion 42 can include an opening 43 through which at least one of the muffler 33 and the tail pipe(s) 35 can be inserted. In one embodiment, the load-carrying platform 10 is formed as a region of the upper frame portion 42, e.g., is monolithically formed. In some arrangements, the opening 43 includes a forward portion 43a and a rearward portion 43b. An upper guard 44 can be provided to cover the muffler 33 from above. The upper guard 44 can be attached to snowmobile 1 adjacent to the forward portion 43a of the opening 43. FIG. 4 shows that in some embodiments, a guard plate 45 can be mounted adjacent to the rearward portion 43b of the opening 43. In one embodiment, the guard plate 45 is formed as a region of a structural member of the snowmobile 1, e.g., as a region of the upper frame portion 42. The guard plate 45 can be monolithically formed as a portion of a frame member. The guard plate 45 preferably extends to a vicinity of a lower portion of the tail pipe 35, e.g., from behind and/or below.

FIGS. 1 and 3 show that the snowmobile can include a duct 51 that can support the radiator 12, which can be disposed above the engine 3. The duct 51 can be located toward the rear of an upper part of the engine compartment 2. The duct 51 conveys the air that has cooled the heat exchanger 12 to a location outside of the engine compartment 2. The duct 51 can be located on a rear side of an electrically driven fan 55 located near the heat exchanger 12.

Figure 8:
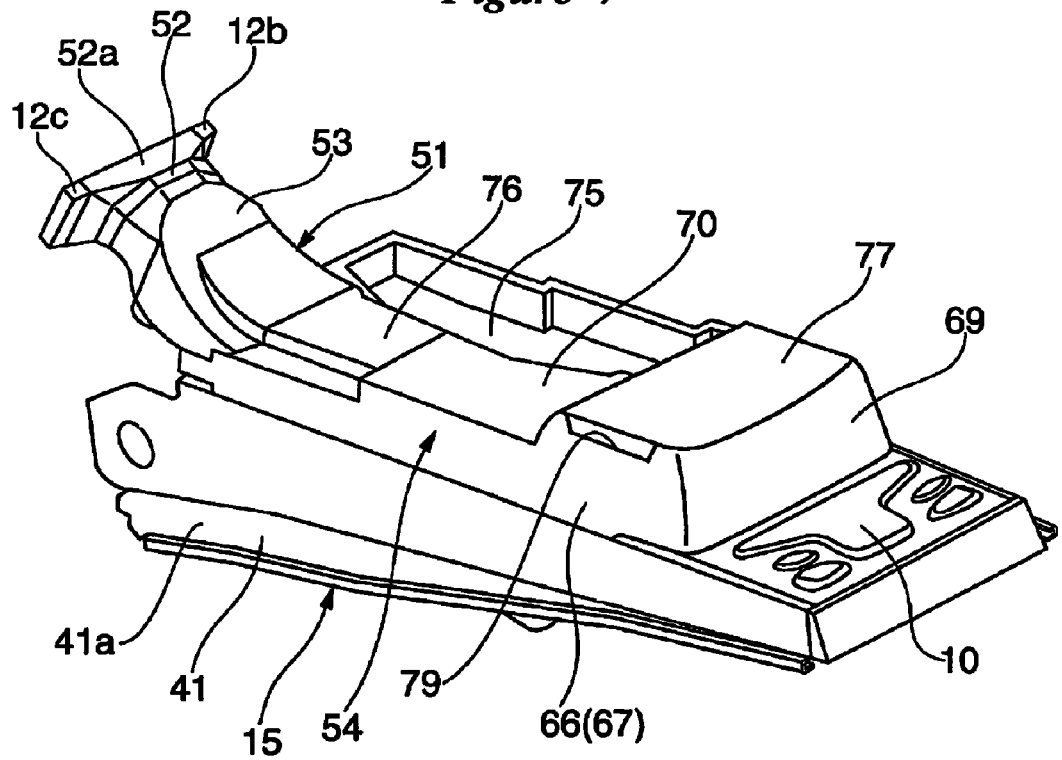
FIG. 8 a perspective view showing a duct main body attached to the rearward portion of the vehicle frame.

With reference to FIGS. 1, 3, and 8, this duct 51 includes in one embodiment a first duct portion 52 to which the heat exchanger 12 can be mounted and a second duct portion 53 that can support the first duct portion 52. The second duct portion 53 can be located in the engine compartment 2 behind the first duct portion 52. The duct 51 preferably also includes a third duct portion 54 that extends rearward from the engine compartment 2.

In one arrangement, the first duct portion 52 is formed like a polygon, e.g., like a rectangle, in cross-section. The first duct portion 52 can be made of any suitable material and by any suitable process, for example by molding a synthetic resin material. The heat exchanger 12 can be fixed to the front of the first duct portion 52. The fan 55 can be electrically driven and preferably is attached to the rear of the first duct portion 52. The fan 55 draws air from within the engine compartment 2 through the heat exchanger 12 and directs the air rearward within the duct 51. The air in the engine compartment 2 is drawn into the engine compartment 2 as the snowmobile 1 is moving, e.g., through vents in an external surface of the snowmobile 1 and into the engine compartment 2.

More particularly, airflow can be drawn into the engine compartment 2 through outside air intake ports 56, 57 (refer to FIGS. 1 and 2) that are formed on a front face of the vehicle body cover 21. The outside air intake ports 56, 57 preferably are formed in places on the front face of the vehicle body cover 21 spaced from the heat exchanger 12 so that snow entering the engine compartment 2 therethrough does not adhering to the heat exchanger 12.

In one arrangement, the heat exchanger 12 is positioned at a central portion of the snowmobile 1, e.g., bisected by or near a central vertical longitudinal plane of the snowmobile 1. The heat exchanger 12 preferably is positioned near an upper portion of the engine compartment 2. The outside air intake port 56 can be formed at a central portion of the snowmobile 1, e.g., bisected by or near a central vertical longitudinal plane of the snowmobile, but preferably at a position that is lower than that of the heat exchanger 12. The outside air intake ports 57 can be formed on one or both lateral sides of the snowmobile 1 at positions that are lower than that of the heat exchanger 12.

In one arrangement of the snowmobile 1, the air cleaner 27 is positioned between the outside air intake port 56 and the heat exchanger 12, whereby the air cleaner 27 can intercept snow that flows into the engine compartment 2 from the outside air intake port 56.

Figure 6:
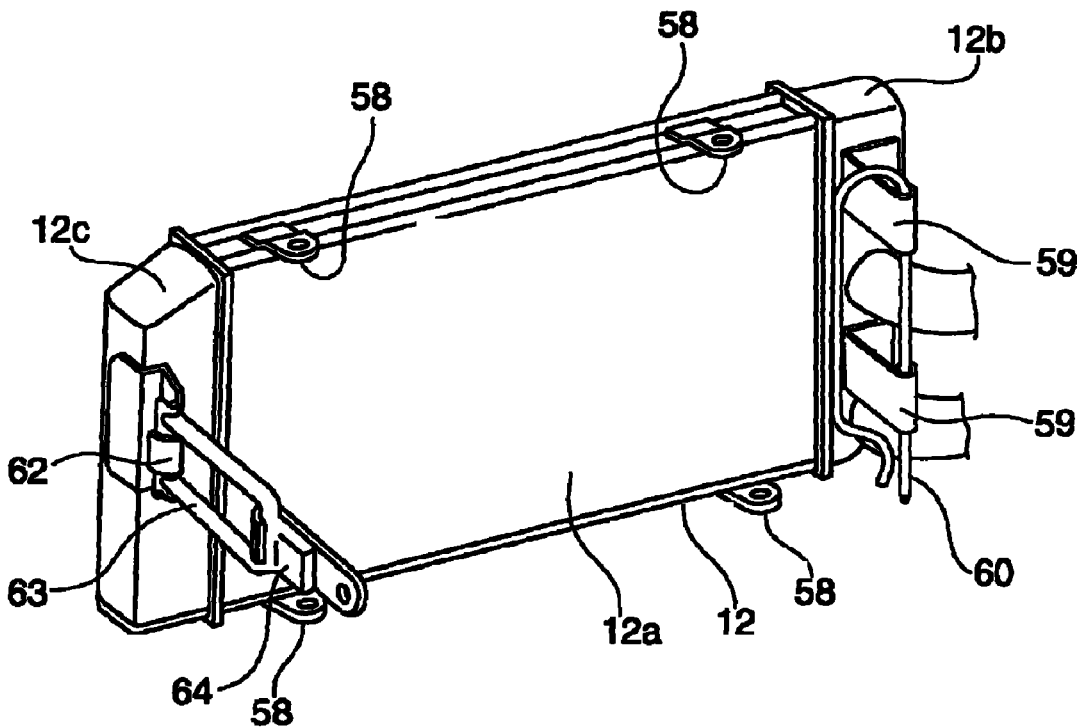
FIG. 6 a top perspective view showing a rearward portion of a radiator illustrating a portion that mounts to the vehicle body.

With reference to FIG. 6, the heat exchanger includes a core portion 12a and coolant tanks 12b, 12c. An opening at a front end of the first duct portion 52 is configured to facilitate airflow through the core portion 12a, e.g., by having the same size and shape as the core portion 12a. The coolant tanks 12b, 12c can be located on sides that are lateral of the central vertical plane of the snowmobile 1 if the heat exchanger 12 is transversely mounted. More particularly, in one embodiment, the coolant tanks 12b, 12c extend laterally of the first duct portion 52 in one arrangement.

Figure 10:
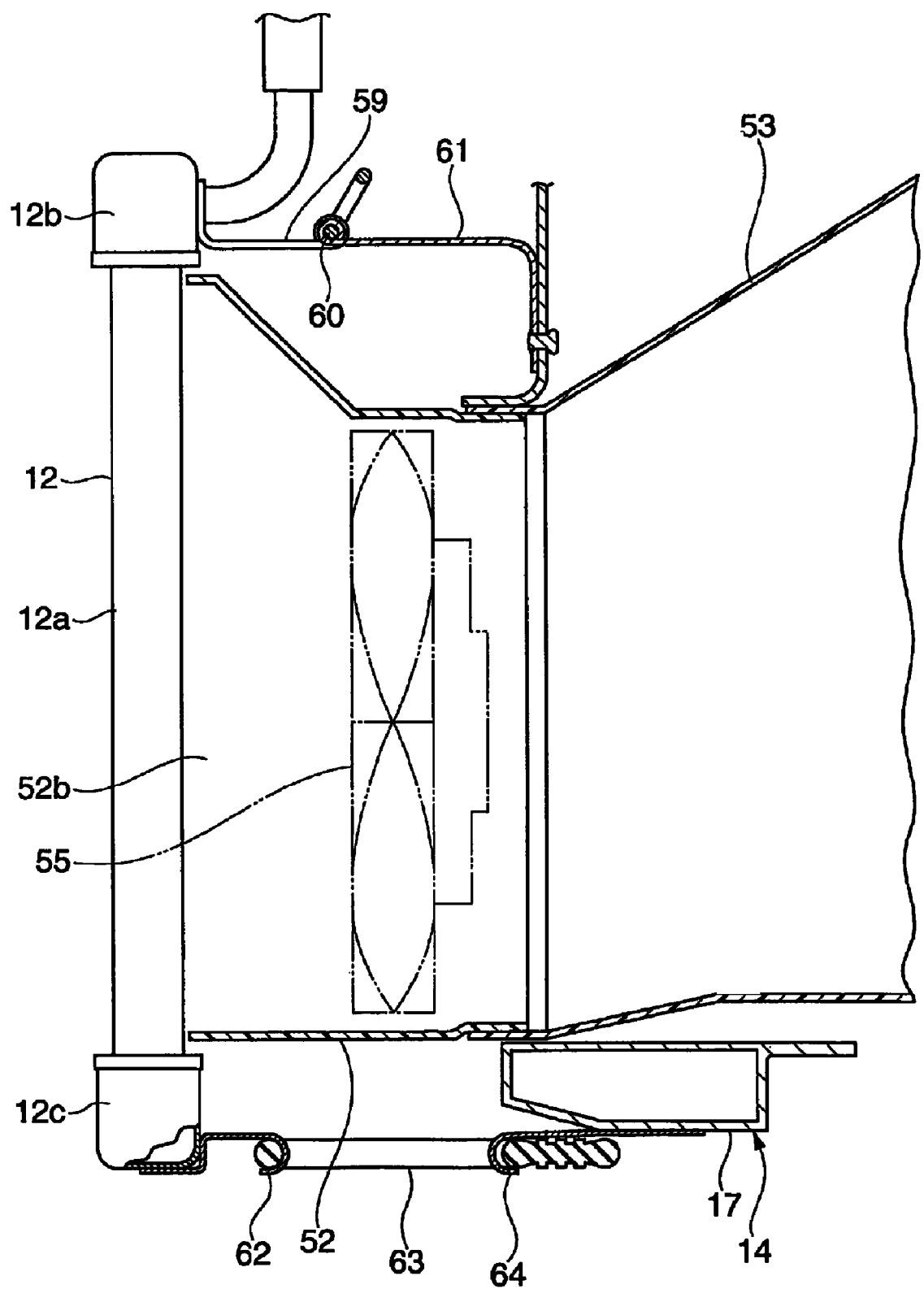
FIG. 10 an enlarged cross-section view showing a forward portion of a duct, the cross-section being taken at section plane 10-10 shown in FIG. 3.

The heat exchanger 12 can be coupled with the first duct portion 52 in any suitable manner, for example by brackets 58. FIG. 6 shows that the brackets 58 can be provided around the core portion 12a, e.g., protruding from upper and lower ends of the core portion 12a of the heat exchanger 12. The brackets 58 can be configured to couple with an upper wall 52a of the first duct portion 52, as shown in FIGS. 5 and 8, and with a lower wall 52b of the first duct portion 52, as shown in FIG. 10. In one arrangement, bolts are used to couple the brackets 58 with the first duct portion 52.

FIGS. 6 and 10 show that in some embodiments the heat exchanger 12 can include supporting stays 59 that extend rearward. For example supporting stays 59 can be welded or otherwise affixed on the right-hand side of the heat exchanger, e.g., to the coolant tank 12b. In one arrangement, the heat exchanger 12 is rotatably supported by a supporting bracket 61, shown in FIG. 10, by a pin 60 that can be detachably connected to the stays 59. The pin 60 extends vertically through the stays 59 and the supporting bracket 61. The stays 59 can pivot relative to the bracket 61 about the pin 60. The pin 60 can have a quick-release construction, e.g., can be constructed such that the pin can be removed without the use of any tools. For example, the pin 60 could be configured as a cotter pin.

The supporting bracket 61 can be supported by a supporting plate (not shown in the drawing) that extends downward from the cross member 16 of the front frame portion 14. Further support for the heat exchanger 12 can be provided on the left-hand side thereof. For example, the coolant tank 12c of the heat exchanger 12 can include a hook 62 or other coupling device coupled therewith. For example, the hook 62 can be welded to the coolant tank 12c. In one arrangement, an elastic member 63 extends rearward of the hook 62 and is coupled under tension with the front frame portion 14. The tension in the elastic member 63 urges the heat exchanger 12 rearward. FIG. 5 shows that a rear end part of the elastic member 63 can be coupled with a hook 64 that is coupled with a rearward portion of the front frame portion main body 17 on the left side of the vehicle body.

By this arrangement, the heat exchanger 12 and the first duct portion 52 can be rotated transversely with the pin 60 as the center of rotation by detaching the elastic member 63 from at least one of the hooks 62, 64. By positioning spark plugs 65 of the engine 3 below the heat exchanger 12, such rotation is provided. See FIGS. 1 and 3.

One advantage of this arrangement is that by rotating the heat exchanger 12 and the first duct portion 52 from a normal position above the engine 3 to the vehicle body right side, a portion above the engine 3 is widely exposed. This facilitates servicing of components in the engine compartment 2, e.g., an attachment or detachment of the spark plugs 65, servicing the heat exchanger 12 or fan 55, etc. The hooks 62, 64 and/or the elastic member 63 comprise detachable securing means, as discussed elsewhere herein. In some embodiments, the securing means has a quick release construction whereby the securing means can be disengaged from the front frame portion main body 17 by hand, e.g., without any tools.

In one arrangement, the second duct portion 53 comprises a polygon, e.g., a rectangle, in cross-section. The second duct portion 53 can be formed of any suitable material and by any suitable technique, e.g., by molding a synthetic resin material. The second duct portion 53 preferably is fixed to a front end of the third duct portion 54. Preferably the second duct portion 53 slants forwardly, upwardly and faces into a rearward portion of the engine compartment 2. Preferably the forward portion of the second duct portion 53 is formed such that a rearward portion of the first duct portion 52 can detachably connected to the second duct portion.

FIG. 1 shows that the third duct portion 54 is formed to reside above the exhaust pipe 26 and to extend substantially horizontally from the engine compartment 2 toward the rear end of the vehicle body, e.g., at least partially below at least one of the seat 7 and the fuel tank 8. FIG. 11 shows that in one embodiment, the third duct portion 54 is defined at least in part by the upper frame portion 42 of the rearward frame portion 15 and a duct main body 66, which can be located on an upper side of the upper frame portion 42. The duct main body 66 can be made of any suitable material and through any suitable process, such as by molding a synthetic resin material. The third duct portion 54 is defined adjacent to the exhaust pipe 26 and at least one vehicle component, e.g., an external vehicle component such as the seat 7 or the fuel tank 8.

FIGS. 8, 9, 11, and 12 show that the duct main body 66 can include a portion having an inverted U shape in cross-section. In one embodiment, the duct main body 66 has lateral walls 67, 67, a front wall 68 (refer to FIG. 9), a rear wall 69, and an upper wall 70. The upper wall 70 connects upper ends of the lateral, front, and rear walls 67, 68, 69 to form a down-facing opening. In one manufacturing technique, the duct main body 66 is molded to a predetermined shape by a molding die. Any other suitable technique can be used. Further, the duct main body 66 can be coupled to the rear part frame 15 by bolts not shown in the drawing.

By attaching the duct main body 66 to the rear part frame 15 like this, an air passage 71 illustrated in FIGS. 11 and 12 can be formed. The air passage 71 can be formed by the upper frame portion 42 and by the walls defined by the duct main body 66. The air passage can be at least partially located between the exhaust pipe 26 and at least one of the fuel tank 8 and the seat 7.

Figure 9:
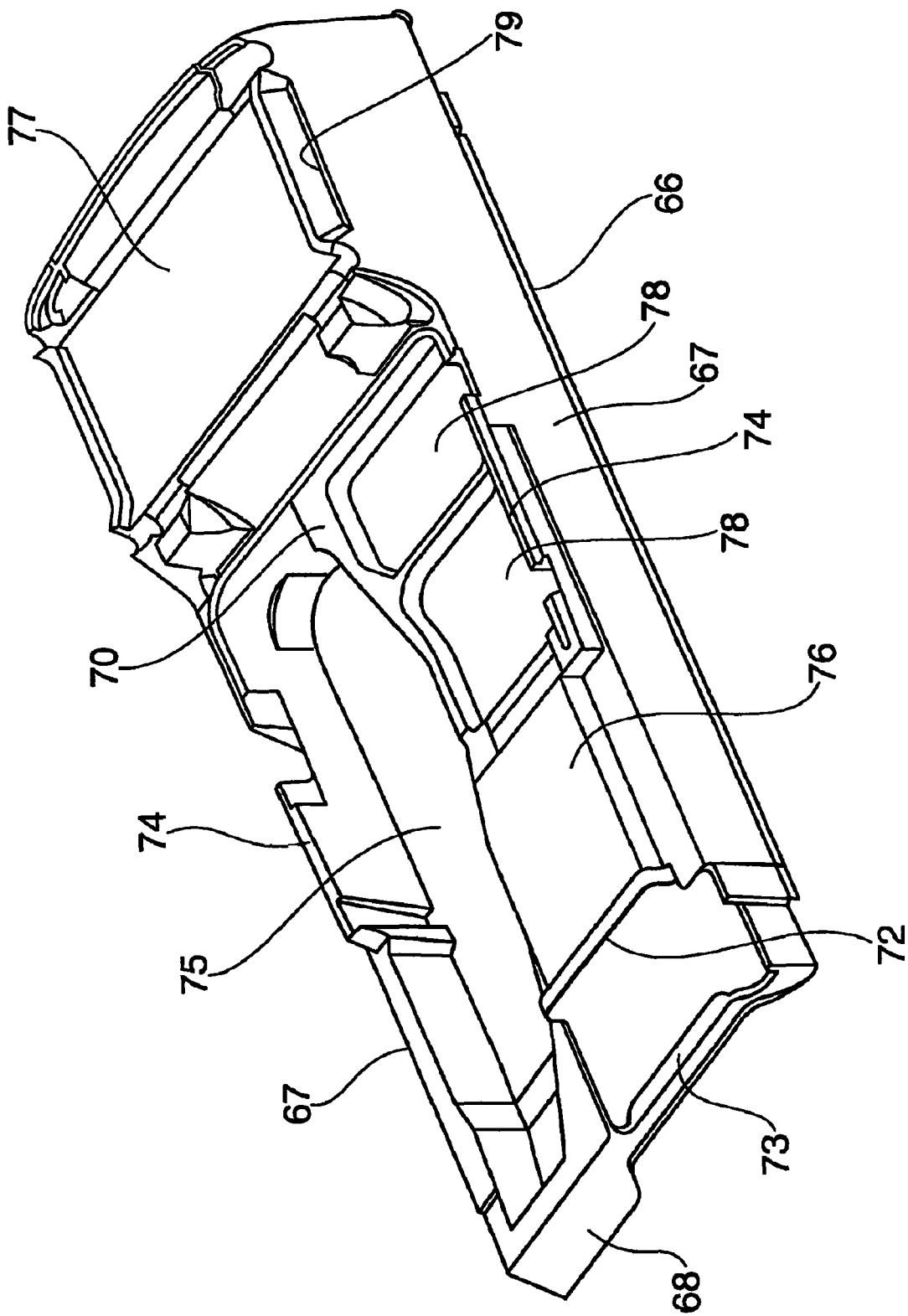
FIG. 9 is a perspective view of the duct main body.

With reference to FIG. 9, a connection port 72 for inserting and fitting a rear end of the second duct portion 53 is formed in a forward portion (upstream side) of this duct main body 66. A bridging portion 73 is formed in and extends transversely in a forward edge of the duct main body 66. The bridging part 73 is configured to enable the forward portion of the duct main body 66 to be coupled with or fixed to the upper frame portion 42. In one arrangement, the rear end of the second duct portion 53 can be connected to the bridging part 73 and the connection port 72.

FIG. 11 shows that in one embodiment, both lateral sides of the duct main body 66 comprise supports 74. The supports 74 can be configured to support at least one of the side parts of the seat 7 and the fuel tank 8. The supports 74 are configured to support and transmit loads from these (and other components in some embodiments) to other load-bearing frame structures of the snowmobile 1 and to a ground surface upon which or over which the snowmobile is positioned or travels. The supports 74 are supported by the longitudinal plate 41b of the side frame portion 41.

In one embodiment, the duct main body 66 is positioned over the exhaust pipe 26, which is positioned on the left-hand side of the vehicle body. Thus, a relatively wide space is formed to the right of the exhaust pipe 26. Accordingly, a storage or accommodation portion 75 that includes a recess or a recessed part that opens upwardly can be formed on one side of the vehicle body. An air passage portion 76 can be formed on the duct main body 66 and be located on another side of the vehicle body. The air passage portion 76 can include one or more lateral walls 67 and the upper wall 70. As shown in FIG. 9, the storage portion 75 is formed to extend from a forward portion of the duct main body 66 to a location forward of a muffler accommodation portion 77, discussed below.

That is, the right lateral side of the duct main body 66 can function as, among other things, a storage box. Additionally, a storage portion 78 (see FIGS. 9 and 11) that is relatively shallow and small can be formed in the air passage portion 76 of the duct main body 66.

In one embodiment, the duct main body 66 is fixed to the upper frame portion 42 forming the air passage 71 therebetween that terminates at the opening 43, which can be an air outlet. Air blown by the fan 55 is directed and flows through this air passage 71. The air is discharged to an outside of the third duct portion 54 through the opening 43 and the air flowing ports 79.

FIG. 4 shows that in one embodiment the muffler 33 is inserted in the opening 43. The muffler 33 is exposed to and cooled by the air discharged downward from the air passage 71 through the opening 43. FIGS. 1, 4, and 12 show that air (shown by white arrows in the drawings) is discharged downward through the opening 43 and is pushed toward the front of the snowmobile 1 by the rotating track belt 5. The air flows toward a forward portion of the vehicle body while being mixed with exhaust gas (shown by black arrows in the drawings) discharged from the tail pipe 35 in a space S. The air from the air passage 71 and the exhaust air from the tail pipe 35 mixes in the location between the track belt 5 and the rearward frame portion 15.

As discussed above, the duct 51 extends from the engine compartment 2 toward the rear of the snowmobile 1 and lies between the exhaust pipe 26 and the seat 7. The duct 51 discharges air that has passed through or by the heat exchanger 12 to the outside of engine compartment 2. The duct 51 also lies between the exhaust pipe 26 and the fuel tank 8. The duct 51 functions substantially as an insulator or a heat insulating material, preventing or minimizing heat transfer from the exhaust pipe 26 other vehicle components, such as the seat 7 or the fuel tank 8. The duct 51 is an efficient insulator because air flow therein prevents heat from accumulating in the duct 51 being transferred to other vehicle components, such as the seat 7 or the fuel tank 8.

Further, the snowmobile 1 uses the duct 51 for multiple purposes, e.g., to assist in cooling the heat exchanger 12 and to insulate the lower side of the seat 7 and the fuel tank 8. Accordingly, separate ducts are not required to discharge cooling air from the engine compartment 2 and to provide thermal insulation for the exhaust pipe 26.

In one embodiment, the third duct portion 54 is defined in part by the upper frame portion 42 and the duct main body 66. More particularly, the upper frame portion 42 can be provided with an inverted U-shaped portion that can be formed in the upper side thereof. This duct main body 66 also can be formed with an inverted U-shaped portion, e.g., by forming the duct main body of a resin in a die. More particularly, the third duct portion 54 can easily be formed by mounting this duct main body 66 onto the upper frame portion 42. Accordingly, the third duct 54 can be easily and economically formed to provide thermal insulation between the exhaust pipe 26 and the seat 7 as well as the fuel tank 8.

The duct main body 66 of this embodiment also is formed with the storage portion 75, which is defined in part by a recess that opens upwardly. The storage portion 75 can be an accommodation or a storage box formed between the exhaust pipe 26 and the seat 7. The accommodation box also can be located between the fuel tank 8 and the exhaust pipe. In some embodiments, the accommodation box can be formed monolithically with the duct 51. For this reason, the snowmobile 1 can combine the thermal insulating properties of the duct 51 and storage feature of an accommodation box into a single structure, defined at least in part by the duct main body 66. The snowmobile 1 thus is not required to have an accommodation box that serves no other purpose than to accommodate baggage.

More particularly, in one embodiment, the snowmobile 1 includes the storage portion 75 that is located on one side, e.g., the right side, of the duct main body 66. The duct main body 66 also is provided with the air passage portion 76 on the other side part, e.g., on the left side. The exhaust pipe 26 is disposed below the air passage portion 76. The storage portion 75 does not impair the heat transfer properties of the duct 51 because the storage portion is laterally off-set from the exhaust pipe 26. Also, the storage portion 75 can be made relatively large by utilizing surplus space formed between the exhaust pipe 26 and the seat 7 and between the exhaust pipe 26 and the fuel tank 8.

More particularly, because the storage portion 75 is formed on one lateral side of the snowmobile 1, the storage box can have one large volume rather than two separate smaller volumes, such as would be the case if the accommodation portion were formed on both lateral sides of the snowmobile 1 or of the exhaust pipe 26. Also, the embodiments described herein have an advantage of reducing the height of the seat 7 compared to an arrangement where the air passage portion 76 and the storage portion 76 are juxtaposed in a vertical direction. Thus, the height of the seat 7 and the fuel tank 8 are relatively low. Lowering the seat 7 and the fuel tank 8 can make the snowmobile 1 easier to mount and to refuel.

Also, in the embodiments of the snowmobile 1 described above, the muffler 33 is disposed in the opening 43 from which the air in the duct 51 is discharged. Thus, the muffler 33 can be cooled by the air which also has cooled the heat exchanger 12. Accordingly, there is no need to provide a dedicated cooling duct in the snowmobile 1 to the rear portion and to the muffler 33 to cool the muffler.

In one embodiment of the snowmobile 1, the heat exchanger 12 is positioned in an upper portion of the engine compartment 2. The outside air intake ports 56, 57 are formed at locations that are offset from a forward projection of the heat exchanger 12 in the front face of the vehicle body cover 21. Thus, it is possible to prevent the snow entering into the engine compartment 2 from adhering to the heat exchanger 12. This arrangement prevents snow from building up on the heat exchanger 12, whereby the cooling ability of the heat exchanger would be decreased because airflow therethrough would be inhibited. Further, by preventing the snow from contacting the relatively hot heat exchanger 12, water vapor in the engine compartment 2 which can be generated by such contact is minimized. By minimizing water vapor in the engine compartment, the lifespan of components sensitive to water vapor can be extended.

In one embodiment, the heat exchanger 12 is rotatably supported to the front part frame 14 by the pin 60 at a lateral portion of, e.g., the vehicle body right side, and by an elastic member 63 coupled with the vehicle body left side. Accordingly, the heat exchanger 12 can be rotated relative to the front frame portion 14 with the vehicle body right side being the center of rotation. The arrangement enables access to components of the snowmobile 1 without requiring the use of any tool.

For example, maintenance of the spark plug 65 located below the heat exchanger 12 can be easily performed. In another embodiment, the heat exchanger 12 can be detachably attached to the vehicle using a clip-like securing member in place of or in addition to using the pin 60 and the elastic member 63. Other coupling devices can be used as well or in place the pin 60 and elastic member 63. In some embodiments, the heat exchanger 12 can be attached using conventional fasteners and tools.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A snowmobile configured to be drive by a track belt, comprising:
   a forward portion defining an engine compartment and a rearward portion comprising at least one vehicle component;
   an engine positioned in the engine compartment;
   an exhaust pipe extending above the track belt from the engine compartment to the rearward portion of the snowmobile;
   a heat exchanger positioned in the engine compartment; and
   a fan positioned near the heat exchanger and a duct provided on a rear side of the fan, the duct having a forward portion having an opening disposed within the engine compartment and above a vertical projection of a top portion of the engine, the forward portion being positioned in the engine compartment, the duct extending downward behind the opening along a rear portion of the engine and extending from the engine compartment to the rearward portion of the snowmobile, the fan and the duct causing air to pass through the heat exchanger and to be discharged outside of the engine compartment, wherein the duct is located between the exhaust pipe and the at least one vehicle component.

2. The snowmobile of claim 1, further comprising an upper frame portion above which the at least one vehicle component is positioned and a duct main body configured to be positioned above the upper frame portion, the duct being defined at least partially between the upper frame portion and the duct main body.

3. The snowmobile of claim 2, wherein the duct main body comprises a U-shaped portion that at least partially defines the duct.

4. The snowmobile of claim 2, wherein the duct main body further comprises a storage portion comprising a recess that opens upwardly.

5. The snowmobile of claim 4, wherein the storage portion is provided on one lateral side of the duct main body and an air passage portion is provided in or on the other side part of the duct main body, the air passage portion defining at least a portion of the duct, the exhaust pipe being disposed below the air passage portion.

6. The snowmobile of claims 1, further comprising a vehicle body cover that covers at least a forward portion of the engine compartment, the vehicle body cover comprising an outside air intake port, wherein the heat exchanger is positioned in an upper portion of the engine compartment at a location off-set from a rearward projection of the air intake port.

7. The snowmobile of claim 1, further comprising securing means for mounting the heat exchanger to a front frame portion of the snowmobile.

8. The snowmobile of claim 7, wherein the securing means permits access to be provided to at least one component in the engine compartment without the use of any tools.

9. The snowmobile of claim 1, further comprising a securing means comprising a hinge member attached to one side of the heat exchanger and an elastic member attached to another side of the heat exchanger.

10. The snowmobile of claim 9, wherein the hinge member is a first hinge member and further comprising a second hinge member and a hook coupled with the front frame portion, the first and second hinge portions configured to be engaged to rotatably support the heat exchanger and the hook configured to engage the elastic member whereby a tension force is transmitted through the elastic member to the heat exchanger and to the frame portion.

11. A snowmobile configured to be driven by a track belt, comprising:
    a forward portion defining an engine compartment and a rearward portion comprising at least one vehicle component;
    an engine positioned in the engine compartment;
    an exhaust pipe extending above the track belt from the engine compartment to the rearward portion of the snowmobile;
    a heat exchanger positioned in the engine compartment; and
    a fan positioned near the heat exchanger and a duct provided on a rear side of the fan, the duct having a forward portion having an opening disposed above a vertical projection of a top portion of the engine, the forward portion being positioned in the engine compartment, the duct extending downward behind the opening along a rear portion of the engine and extending from the engine compartment to the rearward portion of the snowmobile, the fan and the duct causing air to pass through the heat exchanger and to be discharged outside of the engine compartment, wherein the duct is located between the exhaust pipe and the at least one vehicle component; and
    a muffler coupled with a downstream portion of the exhaust pipe, the duct being configured to discharge air adjacent to the muffler.

12. The snowmobile of claim 11, further comprising an upper frame portion above which the at least one vehicle component is positioned and a duct main body configured to be positioned above the upper frame portion, the duct being defined at least partially between the upper frame portion and the duct main body.

13. The snowmobile of claim 12, wherein the duct main body further comprises a storage portion comprising a recess that opens upwardly.

14. The snowmobile of claim 13, wherein the storage portion is provided on one lateral side of the duct main body and an air passage portion is provided in or on the other side part of the duct main body, the air passage portion defining at least a portion of the duct, the exhaust pipe being disposed below the air passage portion.

15. The snowmobile of claims 14, further comprising a vehicle body cover that covers at least a forward portion of the engine compartment, the vehicle body cover comprising an outside air intake port, wherein the heat exchanger is positioned in an upper portion of the engine compartment at a location off-set from a rearward projection of the air intake port.

16. The snowmobile of claim 15, further comprising securing means for mounting the heat exchanger to a front frame portion of the snowmobile.

17. A snowmobile configured to be drive by a track belt, comprising:
- a forward portion defining an engine compartment and a rearward portion comprising at least one vehicle component and a passenger seat;
- an exhaust pipe extending above the track belt from the engine compartment to the rearward portion of the snowmobile;
- a heat exchanger positioned in the engine compartment; and
- a fan positioned near the heat exchanger and a duct provided on a rear side of the fan, the duct having a first portion coupled with the heat exchanger and a second portion separable from the first portion, the second portion of the duct extending from the engine compartment to the rearward portion of the snowmobile at least partially beneath the passenger seat, the fan and the duct causing air to pass through the heat exchanger and to be discharged outside of the engine compartment, wherein the duct is located between the exhaust pipe and the at least one vehicle component;
- wherein a securing means is attached to first and second sides of the heat exchanger.

18. The snowmobile of claim 17, further comprising a first hinge member, a second hinge member and a hook coupled with the front frame portion, the first and second hinge portions configured to be engaged to rotatably support the heat exchanger and the hook configured to engage the elastic member whereby a tension force is transmitted through the elastic member to the heat exchanger and to the frame portion.

19. A snowmobile configured to be drive by a track belt, comprising:
- a forward portion defining an engine compartment and a rearward portion comprising at least one vehicle component and a passenger seat;
- an exhaust pipe extending above the track belt from the engine compartment to the rearward portion of the snowmobile;
- a heat exchanger positioned in the engine compartment; and
- a fan positioned near the heat exchanger and a duct provided on a rear side of the fan, the duct having a first portion coupled with the heat exchanger and a second portion separable from the first portion, the duct extending from the engine compartment to the rearward portion of the snowmobile at least partially beneath the passenger seat, the fan and the duct causing air to pass through the heat exchanger and to be discharged outside of the engine compartment, wherein the duct is located between the exhaust pipe and the at least one vehicle component;
- wherein a hinge member is coupled with one side of the heat exchanger and an elastic member is coupled with another side of the heat exchanger.

20. The snowmobile of claim 19, wherein the hinge member is a first hinge member and further comprising a second hinge member and a hook coupled with the front frame portion, the first and second hinge portions configured to be engaged to rotatably support the heat exchanger and the hook configured to engage the elastic member whereby a tension force is transmitted through the elastic member to the heat exchanger and to the frame portion.

* * * * *